C. A. FOELL.
TONGUE TRUCK.
APPLICATION FILED FEB. 25, 1909.
960,082.
Patented May 31, 1910.
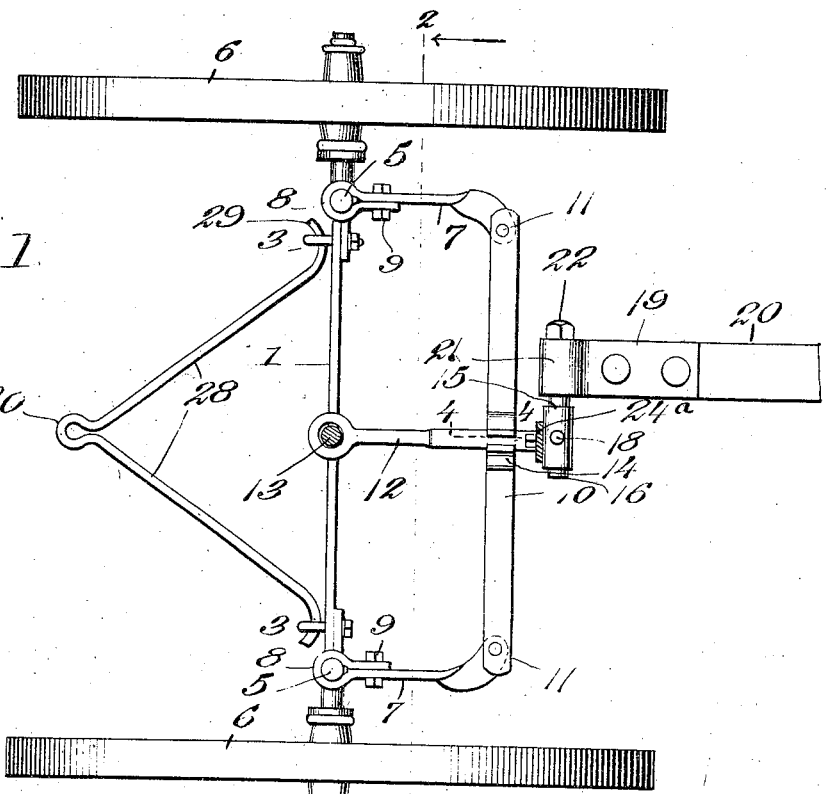
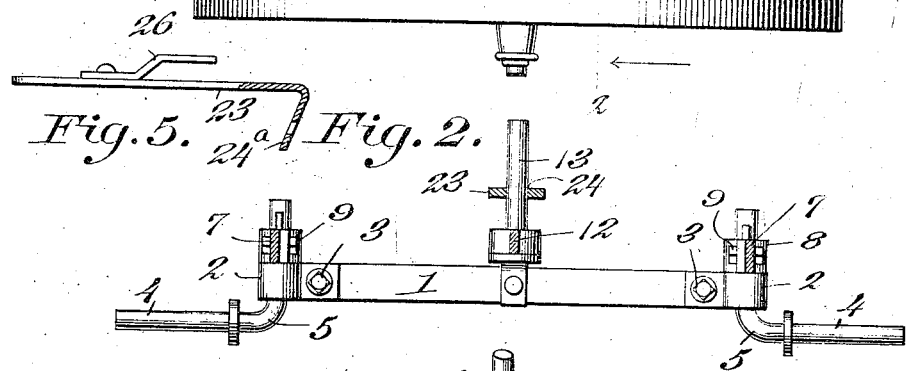
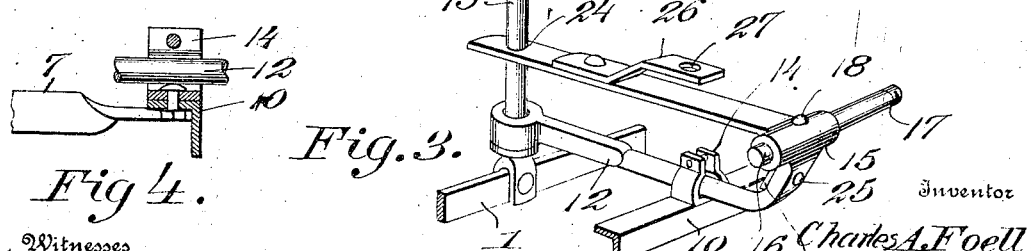

UNITED STATES PATENT OFFICE.

CHARLES A. FOELL, OF ROCKWELL, IOWA.

TONGUE-TRUCK.

960,082.  Specification of Letters Patent.  Patented May 31, 1910.

Application filed February 25, 1909. Serial No. 479,869.

*To all whom it may concern:*

Be it known that I, CHARLES A. FOELL, a citizen of the United States of America, residing at Rockwell, in the county of Cerro Gordo and State of Iowa, have invented new and useful Improvements in Tongue-Trucks, of which the following is a specification.

My invention relates to improvements in tongue trucks for agricultural machines and vehicles, and its primary object is the provision of a device of this character which embodies a construction adapted to permit the machine or vehicle to be turned without liability of the wheels of the truck contacting therewith.

A further object of my invention is the provision of a tongue truck which is simple, durable and efficient, which may be used on any construction of vehicle provided with a tongue, and which may be manufactured and sold at a comparatively low cost.

With the above and other objects in view, the invention consists in the construction, combination and arrangement of parts hereinafter fully described, claimed and illustrated in the accompanying drawing, wherein:

Figure 1 is a top plan view of a tongue truck constructed in accordance with my invention, the bolt being in horizontal section and the clevis bar being omitted. Fig. 2 is a sectional view taken on the vertical plane indicated by the line 2—2 of Fig. 1, the wheels being omitted. Fig. 3 is a perspective view illustrating the means by which the wheels of the tongue truck can be adjusted independently of the axle, and Fig. 4 is a sectional view taken on the line 4—4 of Fig. 1, and Fig. 5 is a detail view in side elevation of the clevis bar, the forward end of the bar being in section.

Referring to the drawing by reference numerals, 1 designates the axle of my improved tongue truck. The axle is preferably constructed of a single length of flat material, and has its ends bent to provide bearings 2, the bent ends being retained in bearing form by means of bolts 3. The axle spindles 4 are provided with angular members 5 which are journaled in the bearings 2. The connection between the axle spindles 4 and the axle 1 is such that the wheels 6 can be moved on the axle to any angle with relation to the line of draft of the machine or vehicle. The members 5 of the axle spindles are secured in the bearings 2 against displacement in any suitable manner and they project above the bearings. Crank arms 7 are secured to the projecting ends of the axle spindle members 5 and project forwardly therefrom. Each crank arm 7 is preferably constructed of a single length of flat material, and has one of its ends formed to provide an eye 8, said ends being retained in eye formation by means of bolts 9. The eyes 8 receive the projecting ends of the axle spindle members 5. The connection between the eyes and members is such that the crank arms are prevented from having any movement on the members. The free ends of the crank arms 7 are disposed horizontally and are curved in the direction of each other. The curved ends of the arms are connected to a bar 10, which is preferably angular in cross-section and which is pivotally secured to the ends of the crank arms through the medium of bolts 11. A hound 12 is pivotally secured at one end to a bolt 13, which rises vertically from and which is pivotally secured to the axle 1, the pivot of the bolt 13 being located centrally between the ends of the axle. The hound 12 extends forwardly from the bolt 13 and is connected to the bar 10 through the medium of a clip 14. The connection between the hound 12 and the axle spindle is such that the wheels 6 of the truck will at all times travel in planes parallel to the line of draft. The forward end of the hound 12 is provided with a horizontally disposed cylindrical head 15 having an opening 16 extending longitudinally therethrough. The head 15 extends axially of the truck and is disposed above and beyond the bar 10. The opening 16 is adapted to receive a draft bar 17 which may be adjusted upon the hound axially of the truck and which is held in its adjusted position by means of a set screw 18, the set screw passing through the head 15 and engaging the bar. The thill iron 19 of a tongue 20 is provided with an eye 21 adapted to receive the draft bar 17, and it is held in position upon the draft bar by means of a nut 22 which is mounted upon the bar. The manner of connecting the tongue 20 to the truck positions the tongue to one side of the longitudinal center of the machine or vehicle. The position of the tongue 20 with relation to the longitudinal center of the machine or vehicle may be altered by adjusting the draft bar 17 in a manner which should be apparent to enable a single or double tree to be connected to the machine or vehicle provided with my improved truck. The truck is provided with a clevis bar 23 which is provided at one end with an eye 24 adapted to receive the bolts 13. The opposite end of the clevis bar is formed to provide an attaching flange 24ª which is secured to the forward end of the hound 12 by means of a bolt 25. A strap 26 is secured to the clevis bar 23 and is provided with an opening 27 for the passage of a bolt adapted to secure a single or double tree to the clevis bar. A substantially V-shaped brace 28 which includes curved attaching ends 29 and an eye 30 is secured to the axle 1 by having its attaching ends 29 passed through the eyes of the bolts 3.

In practice, the truck is secured to an agricultural machine or vehicle through the medium of the bolt 13 and brace 29. The bolt 13 passes through an opening formed in the machine or vehicle and a fastening element is let through the eye 30 of the brace into the machine or vehicle. As the wheels of the truck may be moved independently of the axle thereof, it should be apparent that the wheels of the truck will not contact with the machine or vehicle during the turning thereof, and that the machine or vehicle may be turned very shortly. As the bolt of the truck is pivotally secured to the axle thereof, the wheels of the truck may be moved vertically independently of the machine or vehicle, thereby compensating for any unevenness in the ground over which the machine or vehicle is being drawn.

Changes in the form, proportions and minor details of construction may be made within the scope of the claims without departing from the spirit or sacrificing any of the advantages of the invention.

Having thus described the invention what I claim as new is:

1. A tongue truck comprising an axle spindle journaled on the axle, wheels journaled on the spindle, arms secured to the spindles, a bar secured to the arms, a hound pivotally secured at one end to the axle and provided at its free end with a hollow cylindrical head extending axially of the truck, means securing the hound to the bar, a draft-bar adjustably mounted in the head and extending axially of the truck, a set screw carried by the head and engaging the draft-bar, a tongue, and a thill iron secured to the tongue and provided with an opening receiving the draft-bar.

2. A tongue truck comprising an axle having its ends bent and secured to form bearings, axle spindles having angular members journaled in the bearings, arms each having one of its ends bent and secured to form an eye, the eyes of the arms receiving the angular members of the spindles, said arms projecting forwardly from the angular members of the spindles and having their free ends inclined inwardly, a bar secured at its ends to the free ends of the arms, said bar being angular in cross section, a bolt secured at its lower end to the axle, a hound pivotally secured at one end to the bolt and formed at its free end with a hollow cylindrical head extending axially of the truck, said head being disposed above and beyond the bar, a clip securing the hound to the bar, a draft-bar adjustably mounted in the head and extending axially of the truck, a set screw carried by the head and engaging the draft-bar, a clevis bar secured at one end to the bolt having its free end provided with a flange, means engaging the flange and hound, and a strap secured to the clevis bar.

In testimony whereof I affix my signature in presence of two witnesses.

CHARLES A. FOELL.

Witnesses:
JOHN JOHNSON,
D. H. ANGELL.